Jan. 23, 1945.  H. J. MONROE  2,367,841
CUTTER
Filed Sept. 27, 1943
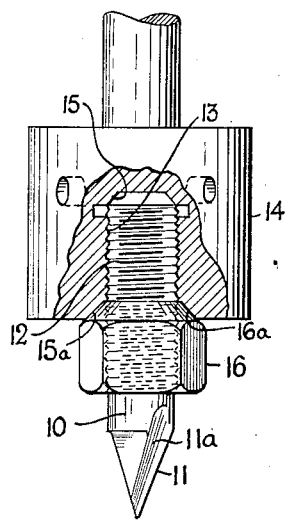
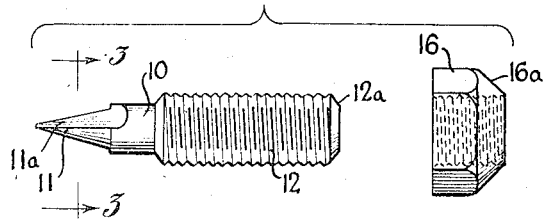
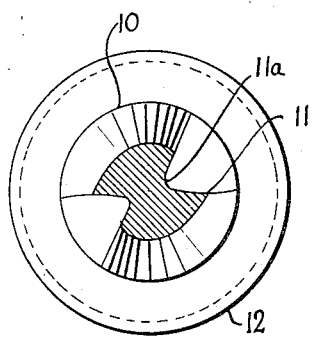
Inventor
HARRY J. MONROE
Attorneys Patented Jan. 23, 1945

2,367,841

UNITED STATES PATENT OFFICE 2,367,841

CUTTER

Harry J. Monroe, Akron, Ohio, assignor to The Firestone Tire & Rubber Company, Akron, Ohio, a corporation of Ohio Application September 27, 1943, Serial No. 504,029

1 Claim. (Cl. 29—103)

This invention relates to cutters, especially of the type adapted for use on a milling or engraving machine.

Heretofore milling and engraving machine cutters have usually been formed with tapered shanks that fit into complementary tapered sockets formed in the spindles associated with the machines. The individual cutter would be held in its socket by a suitable locking device such as a set screw. One disadvantage of such cutters is that it is difficult to maintain the cutters tightly in their sockets and as a result they frequently vibrate and chatter and require frequent resetting. Obviously that is undesirable. Ordinarily, the cutting portion of the tool is appreciably smaller in diameter than the largest portion of the tapered shank which necessitates wasting tool steel by cutting down a bar of tool steel to the desired cutter size. Moreover, appreciable machining time is required to remove such unrequired tool steel.

One object of the invention is to provide a novel cutter for engraving and/or milling machines, which cutter can be made from a relatively small diameter bar of tool steel.

Another object of the invention is to provide an improved cutter of the class described which can be manufactured more easily than previously known types of cutters.

A further object of the invention is to provide a cutter which can be held rigidly in a spindle and will not vibrate therein or loosen upon continued use.

The foregoing and other objects will be apparent from the accompanying specification, when considered with relation to the accompanying figures of drawing, wherein:

Fig. 1 is an elevation of a cutter embodying the invention, showing it in operative position in a spindle;

Fig. 2 is an exploded elevation of the cutter of Fig. 1 and its lock nut; and

Fig. 3 is a section of the cutter point, to an enlarged scale, on the line 3—3 of Fig. 2.

Referring in detail to the drawing, a pointed cutter 10, adapted for use on milling or engraving machines, is shown. The cutter 10 is provided with one or more cutting edges 11 on the tapered point thereof, which edges may extend longitudinally of the cutter and be preceded by a recessed portion 11a in the cutter.

In order to mount the cutter 10 solidly and retain it tightly in its holder, a cylindrical, threaded shank 12 is formed on the cutter. The shank 12 is designed to be screwed into and snugly received in a tapped bore 13 formed in the center of the lower end of a spindle 14 which is a part of the operative machine in which the cutter is to be used. The closed inner end or bottom of the bore 13 is tapered off at 15 at a 45° angle while the base end of the cutter 10 is correspondingly beveled at 12a at a 45° taper so that the cutter can be firmly seated in the bottom of the bore 13. The lower or outer end of the bore 13 is countersunk, at a 45° angle, at 15a, and a lock nut 16, having its forward edge 16a tapered at a 45° angle to mate with the countersunk end 15a of the bore 13, is screwed onto the shank 12 and locked against the countersunk end of the spindle 14 to hold the cutter 10 tightly therein. Such tight positioning of the cutter is retained even after continued use and adds materially to the life of the cutter as well as to insure good results therefrom.

It will be noted that the shank 12 is only slightly larger in diameter than the operative, or cutting section of the cutter 10. Hence the cutter 10 can be made from smaller diameter tool steel than previous types of cutters that were provided with tapered shanks having sections of considerably greater diameter than the cutting part thereof. Also, the present type cutter can be made more rapidly than old style cutters; for example, one cutter made in accordance with previous practice took 29 minutes to form while a similar cutter made in accordance with the present invention took but 10 minutes to make. Furthermore, the new style cutter required 10% less steel.

In some cases, further savings can be effected as the cutter 10 is worn away if it is not essential that the base 12a of the shank 12 be seated on the inner end of the bore 13. That is, the forward portion of the shank 12 may be cut away to form new cutting edges for the cutter.

While one embodiment of the invention has been completely illustrated and described herein, it will be apparent that further modification thereof may be made without departing from the scope of the invention as set forth in the accompanying claim.

What is claimed is:

In a machine, a spindle and cutting assembly comprising a spindle having a tapped bore extending into only one end thereof, which bore is countersunk at its open end and tapers inwardly at its closed end, a cutter having a threaded cylindrical shank formed at one end thereof received in and snugly engaged with the bore of said spindle, the inner end of the shank of said cutter being beveled to mate with the inner end of the bore of said spindle and being tightly seated thereon, a portion of said shank extending from said spindle, and a lock nut having a tapered front end adapted to mate with the countersunk end of the bore of said spindle engaged with the exposed threaded section of said shank and being tightly screwed against the end of said spindle whereby said cutter is rigidly mounted in said spindle and will be retained in such position even after continued periods of use.

HARRY J. MONROE.